June 20, 1967  M. A. ORDORICA, JR  3,326,064
DIFFERENTIAL TRANSMISSION UNIT HAVING A
RESILIENTLY PRELOADED CLUTCH THEREIN
Filed Jan. 13, 1965  3 Sheets-Sheet 1

FIG. 1

INVENTOR.
MIGUEL A. ORDORICA JR.
BY Walter E. Pavlick
Harold R. Shell
ATTORNEYS

FIG. 2

INVENTOR.
MIGUEL A. ORDORICA JR.
BY Walter E. Pavlick
Harold D. Hall
ATTORNEYS

INVENTOR.
MIGUEL A. ORDORICA JR.
BY Walter E. Pavlich
Harold D. Shall
ATTORNEYS 3,326,064
DIFFERENTIAL TRANSMISSION UNIT HAVING A RESILIENTLY PRELOADED CLUTCH THEREIN
Miguel A. Ordorica, Jr., Lambertville, Mich., assignor to Dana Corporation, Toledo, Ohio, a corporation of Virginia
Filed Jan. 13, 1965, Ser. No. 425,187
20 Claims. (Cl. 74—711)

This invention relates to differential transmission units of the limited slip type and more particularly to such units wherein the compensating action of the gearing is retarded by a resiliently preloaded clutch means.

The conventional differential, as used today in most motor vehicles, divides the driving torque equally between both driving wheels. Accordingly, in this connection, it should be noted that a conventional differential is free to differentiate and if one wheel is incapable of transmitting any torque because of a lack of traction with the ground, no torque will be transmitted to the other wheel even if the latter has traction; under these conditions the wheel having traction will remain stationary while the wheel having no traction will be driven and rotated by the differential while transmitting no torque. It should be noted, that when the term "free to differentiate" is utilized, that inadvertent friction acting upon and within the differential is being ignored. This free differentiation is a definite disadvantage while driving under adverse conditions, as when the traction of one of the wheels is limited by slippery road conditions.

Many designs of limited slip differentials have been made in an effort to provide that a substantial driving torque is available to both driving wheels of a motor vehicle even though one of the driving wheels has little or no traction, and still permit efficient compensating action where one wheel must rotate faster than the other, as when the vehicle makes a turn. Some of these prior art constructions have been provided with resiliently preloaded clutch means to inhibit or retard this free differential action. Other constructions have been provided with means which utilize the axial thrust of the differential side gears or other means responsive to the transmission of torque by the differential to load the friction clutch means. In addition to this torque responsive loading, some constructions utilize resilient means in the form of coil springs between the side gears to provide a preload on the friction clutch means. In this particular case, however, this minimum preload adversely affects the normal operation and backlash of the side gears since it affects the meshing of the gear teeth of the differential gear train.

Other prior art constructions also utilize a torque responsive means in the form of the axial thrust of the differential side gears to load the friction clutch means as well as incorporating resilient means for preloading the clutch means. In this construction the clutches are provided with pressure plates which extend radially beyond the side gears and the resilient means are disposed between such pressure plate extensions and impose its acting load simultaneously on both of the clutch means independently of the differential housing and the gear teeth of the gear train. Accordingly, the resilient means is shared by the clutch means and imposes an equal preloading force thereon.

Another prior art construction utilizes, in addition to the torque responsive means, a resiliently preloaded clutch means wherein the resilient means imposes the preload on the clutch means independently of the gear train by preloading the clutch means between a pair of spaced portions of the housing.

In these above referred to prior art differentials, the assembling of the clutch components into the differential housing presents a major problem. Also the manufacturing tolerances in machining the housing areas which receive the clutch components and the various cooperating parts are critical and variations therein may also cause undesirable operational characteristics.

The mechanism, as hereinafter described, among its novel features, includes a self-contained preloaded clutch means which may be resiliently preloaded before the various components of the differential are assembled in the housing and, when assembled, provides a differential mechanism in which the differential action is frictionally inhibited so that a usable amount of torque will be transmitted to either wheel even though one of the same may have little or no traction.

Therefore, an object of this invention is to provide a differential mechanism including friction clutch means for retarding the free differential action thereof, wherein the clutch means is resiliently preloaded independently of the gear case, and a load on the clutch means is also provided by means responsive to the torque being transmitted by the mechanism.

Another object of this invention is to provide a differential mechanism with clutch means for inhibiting the differentiation thereof, wherein means are provided which impose an energizing force to the clutch, independently of the differential mechanism.

Still a further object of this invention is to provide a differential mechansm including a pair of side gears with a constantly operating clutch means disposed between the differential case and at least one of the side gears to inhibit spinning of a wheel which has lost traction.

Still another object of this invention is to provide a differential mechanism including a differential housing, a gear train disposed in said housing and a pair of clutch means for inhibiting relative rotation of members of said gear train, wherein separate resilient means are provided for each of the clutch means, and each resilient means preloads the clutch means associated therewith independently of the housing, the teeth of the gear train and the other of the clutch means.

Another object of this invention is to provide such a differential as described immediately above which includes loading means responsive to the transmission of torque by the differential mechanism for imposing a load on the clutch means, which means may include a portion of the mechanism.

A further object of this invention is to provide a preloaded self-contained multiple disk clutch unit which can be quickly assembled and disassembled as a unit.

Yet a further object of this invention is to provide a differential mechanism with a self-contained clutch unit which may be readily installed or removed from the differential gear unit alone or simultaneously with other components of the unit.

A still further object of this invention is to provide a differential mechanism with a differentiation retarding clutch means which is of simple construction, easy and economical to manufacture and yet is very durable and dependable.

Other objects and advantages of this invention will appear in the following description and appended claims, reference being had to the accompanying drawings forming a part of this specification wherein like reference characters designate corresponding parts in the several views. In the drawings:

In one embodiment of this invention a differential power transmission gear train is operatively disposed within a gear case. A self-contained clutch means is operatively disposed between the gear train and the case to oppose relative rotation between members of the gear train. Resilient means independent of the power gear train and the gear case provides an initial bias on the clutch means. The gears of the gear train are meshed in a relationship to provide a component of tooth pressure for urging gears of the gear train axially outward which thereby provide torque responsive means which adds to the initial loading of the clutch means in response to the transmission of torque by the gear train.

Figure 1:
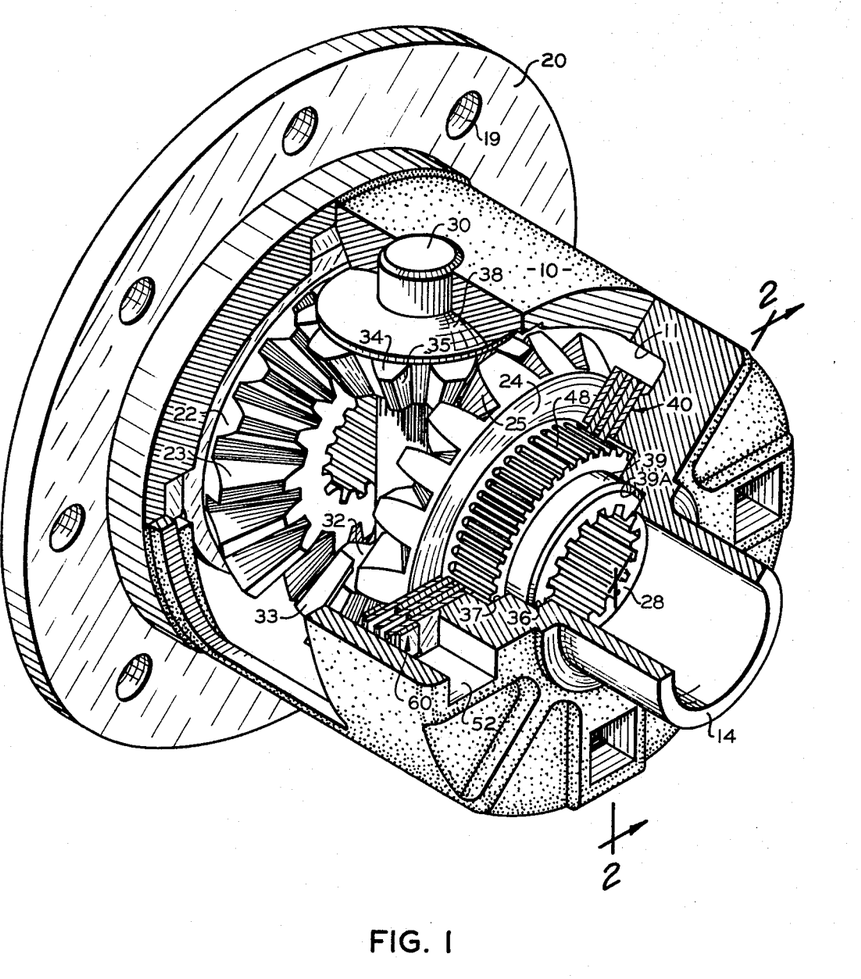
FIG. 1 is an isometric view, partially in section, and with portions broken away, showing an embodiment of this invention.
Figure 2:
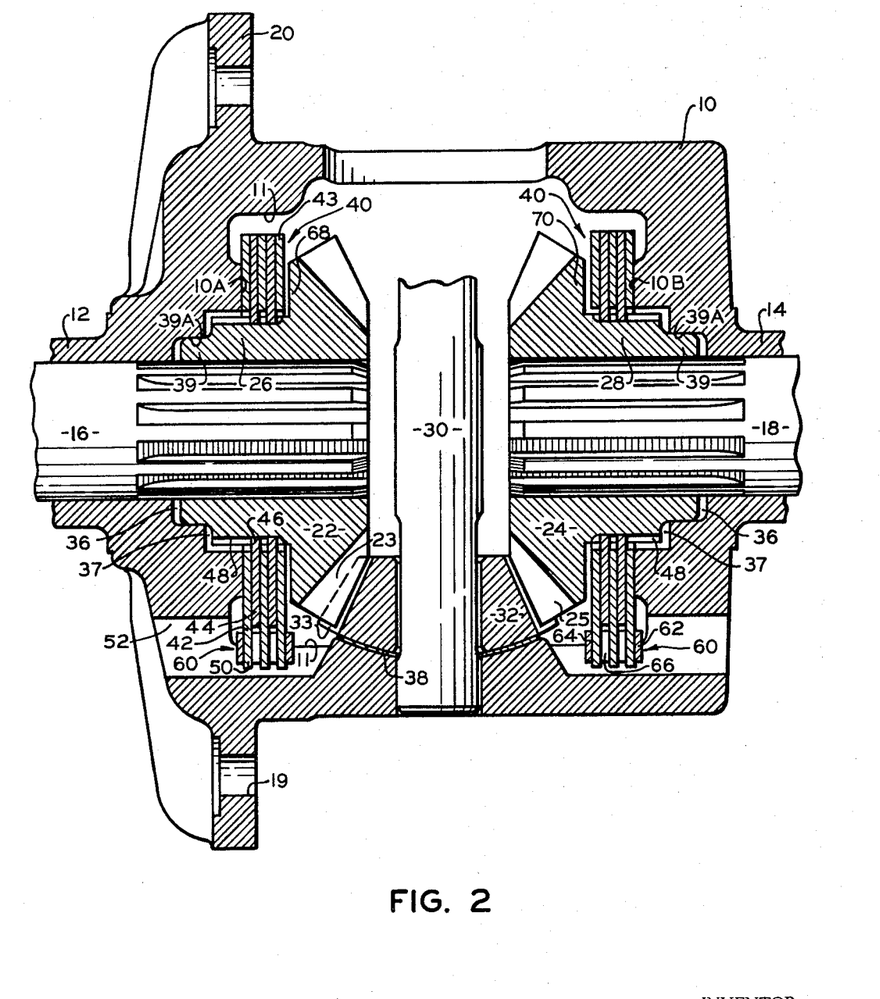
FIG. 2 is an axial sectional view of the differential transmission mechanism taken along the lines 2—2 in FIG. 1.

Referring to the drawings, particularly FIGS. 1 and 2, a casing 10 is provided with integrally formed opposed hubs 12 and 14 extending from the ends thereof. A pair of opposed axle or output shafts 16 and 18 have their adjacent or inner ends projecting into the hubs 12 and 14 respectively and being rotatable relative to the casing 10 and each other. The axle shafts 16 and 18 at their outer ends are suitably connected to the driving wheels (not shown) of a vehicle equipped with the differential of this invention. A conventional ring gear (not shown) may be attached to a circumferential flange 20 formed on the casing 10 as by means of bolts (not shown) which are secured through apertures 19 in the flange; which ring gear is adapted for the reception of drive torque from a suitable source (not shown) and to drive the case 10 about its axis of rotation. As is well known, the case 10 is enclosed and rotatably mounted in a conventional manner within a differential housing (not shown) which carries the usual supply of lubricant for the differential.

Positioned within the case 10 are axially aligned side gears 22 and 24 arranged in an opposed spaced-apart facing relation. The side gears 22 and 24 are provided with outwardly extending hubs 26 and 28 which are internally splined to receive mating external splines on the axle shafts 16 and 18 respectively whereby the side gears are mounted on the axle shafts for unitary rotation and relative axial movement.

Extending diametrically through the case 10 and centrally between the side gears 22 and 24 is a spider member or pin 30. The spider member 30 is of elongated substantially cylindrical configuration and rotatably carries thereon a pair of diametrically opposed compensating or pinion gears 32 and 34 adjacent its outer ends. The compensating gears 32 and 34 have teeth 33 and 35 respectively intermeshed with the teeth 23 and 25 respectively of the side gears 22 and 24; which teeth have positive pressure angles and are adapted to transmit torque between the gears and upon such transmission of torque, the teeth acting as cams, cause the side gears to be urged axially outwardly and the pinion gears to be urged radially outwardly. Thrust washers 38 are inset in the casing 10 and have a contour conforming to the outer faces of the pinion or compensating gears 32 and 34 to limit outward movement thereof upon rotation of the gears, and spaces 36 and 37 are provided between each side gear and the adjacent portion of the casing 10 to permit axial outward movement of the side gears; each of the hubs 26 and 28 being provided with pilot portions 39 of reduced diameter with the pilot portions being rotatably and slidably received in counterbores 39A formed in the casing 10.

A pair of clutch assemblies shown generally at 40 are provided with one being disposed axially intermediate each side gear 22 and 24 and the adjacent end wall 10A and 10B respectively of the casing 10 and adapted to inhibit relative rotation of the members or gears 22, 24, 32 and 34 of the gear train. Although two clutch assemblies 40 are shown in the drawings, in some cases one clutch assembly will suffice inasmuch as the provision of a friction resistance between two relatively rotating members of a differentiating differential mechanism is effective throughout the differential.

More particularly, each clutch assembly 40 includes first and second pluralities of friction members 42 and 44, which members having cooperating radially extending friction surfaces thereon adapted to be pressed into frictional engagement and thereby provide a clutching action. The members 44 are annular in shape and are provided with a plurality of internal splines 46 which cooperate with and are splined to peripheral splines 48 formed on the hubs 26 and 28 of the side gears 22 and 24 respectively whereby the friction surfaces of the members 44 are drivingly connected to the gear teeth 23 and 25 of the side gears. The periphery of the members 44 are spaced from the adjacent internal wall 11 of the casing 10 and adapted to rotate relative thereto while, as a result of the above described spline connection, the members 44 are adapted to rotate unitarily with while being axially movable relative to the side gear carrying the same and the gear teeth thereof.

The members 42 are also substantially annular in form, having an internal opening which is radially spaced from the hubs 26 and 28, and are provided with a periphery 43 which is radially spaced from the internal wall 11 of the casing 10, and a plurality of circumferentially spaced driving means in the form of tangs 50 which extend radially from the periphery 43 thereof and register with and cooperate with axially extending slots 52 formed in the casing 10, whereby the members 42 are adapted to rotate unitarily with the casing 10 while being axially movable relative thereto; the members 42 including the tangs 50 being disposed axially intermediate the side gears 22 and 24 and the adjacent end walls 10A and 10B respectively of the casing. Preferably, each clutch assembly 40 includes at least a pair of the members 42 at the opposed axial sides thereof with a member 44 interleaved therebetween; however, greater numbers of the members 42 and 44 may be utilized and, as shown herein, three members 42 are interleaved with two members 44. As shown, each member 42 has four equally spaced tangs 50 with each tang being disposed in an axially extending slot 52 formed in the wall 11 of the casing 10, so that there are three axially aligned tangs 50 in each slot 52. It is understood that forms of drive means other than tangs may be utilized and that other numbers of tangs 50 may be provided on the members 42 cooperating with a suitable number of grooves 52.

Figure 3:
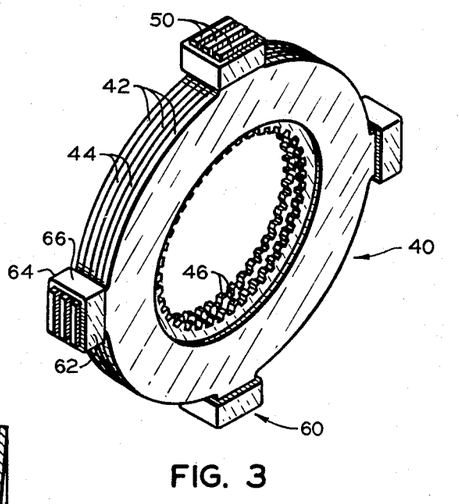
FIG. 3 is an isometric view of a self-contained clutch means usable in the differential of FIG. 1.

The clutch assemblies 40 also each includes holding means in the form of axially spaced abutting means shown generally at 60; which abutting means are disposed axially intermediate the gear teeth 23 and 25 of the side gears 22 and 24 respectively and the walls 10A and 10B of the casing 10 respectively. More particularly, the clutch assemblies 40 are in the form of an integral clutch pack which may be inserted into the casing 10 as a pre-assembled unit. To this end, the abutting means 60 each include a pair of axially spaced radially extending abutting surfaces 62 and 64 integrally interconnected by an axially extending web 66. The abutting means 60 shown in the drawings was conveniently formed from a piece of tubing of rectangular cross-section; however, it should be noted that the desired abutting surfaces and interconnecting webs can be made in other manners.

The abutting means 60 engage the opposed axially outer sides of the outer friction members 42 of the clutch assemblies and thereby hold the same in a clutch pack arrangement. As shown, one abutting means 60 is positioned about the axially aligned tangs 50 of the members 42 in each groove 52 with the web 66 thereof interposed between the tangs and the side of the groove. Accordingly, it is seen that the assemblies 40 are axially movable relative to both the casing 10 and the side gears 22 and 24, and the abutting means 60 is separate from the casing 10.

Figure 4:
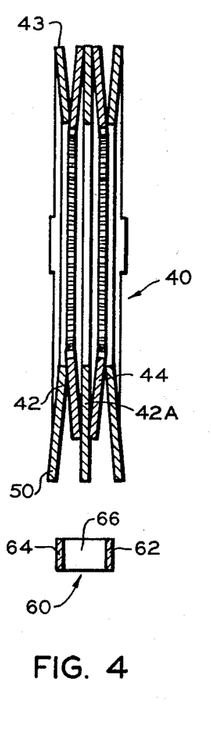
FIGS. 4, 5 and 6 are sectional views of the self-contained clutch means in an unconfined relationship which clutch means are adapted for use in a differential according to FIG. 1; each figure showing a different arrangement of the elements of the clutch means, with the clutch means being viewed as though seen along the lines 2—2 of FIG. 1.

The clutch assemblies 40 also include resilient means for resiliently preloading the friction surfaces of the members 42 and 44. More particularly, and referring to FIG. 4, it has been found that a resilient preload can be provided in the assembly 40 by utilizing members 42 and 44 which have been deformed in such a manner that they act as resilient washers. In FIG. 4, the axially outer members 42 have been provided with an outwardly facing concave dish form, while the members 44 have been provided with a like form which faces inwardly. The central member of the assembly, indicated at 42A, has been formed substantially flat; however, the same also may be of dished configuration.

With the dished form as shown, the members have such a configuration that they can commonly be referred to as a Belleville spring; however, it should be noted that other resilient washer shapes can be utilized and are considered to be within the scope of this invention. Further, the arrangement of the members 42 and 44 in FIG. 4 is such that they resiliently act in series, that is their loads are not additive; however, parallel resilient arrangements or series-parallel resilient arrangements can also be utilized by properly arranging the resilient spring washers and by properly selecting the load, size, and friction characteristics desired.

In order to complete the clutch assembly, the members 42 and 44, as shown in FIG. 4, are compressed substantially flat and the abutting means 60 are then positioned about the aligned tangs 50 thereof. It is preferred that before and during such compressing, the tangs 50 and splines 46 of the members 42 and 44 respectively are positioned and maintained in proper alignment. Since in the assembled condition the members 42 and 44 are substantially flat, the adjoining cooperating surfaces thereof are operative as friction surfaces and, because of the resilient action of the members, are resiliently preloaded.

Figure 5:
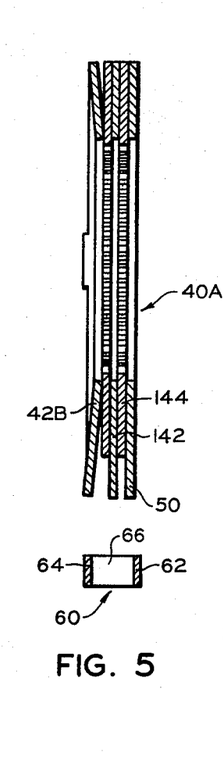

In FIG. 5, another arrangement of friction members are shown, with all the members 142 and 144 except for the tanged member on the left indicated at 42B, being formed substantially flat. The member 42B is provided with an outwardly facing concave dish form so that upon all the members being compressed substantially flat and the abutting means 60 positioned over all the aligned tangs 50, the assembly, indicated at 40A, is resiliently preloaded. By properly selecting the resilient characteristics of the member 42B, the desired preload can be provided.

Figure 6:
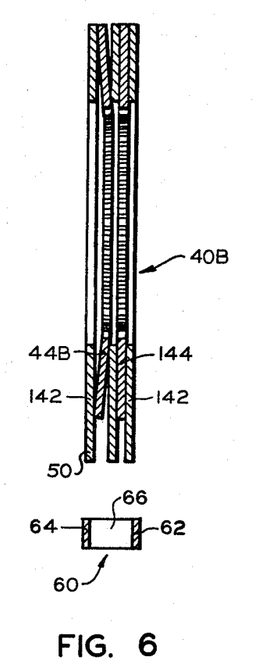

In FIG. 6, still another arrangement of friction members is shown wherein the tanged members 142 and the internally splined member 144 on the right are substantially flat and the internally splined member on the left, indicated at 44B, is formed with a concave dish. When all these members are pressed substantially flat and the abutting means 60 positioned about the aligned tangs 50, the assembly, indicated at 40B, is resiliently preloaded. By selecting the proper resilient characteristics of the member 44B, the desired resilient preload can be provided.

The preloaded clutch assemblies 40, 40A or 40B can now be assembled as a unit into the differential casing 10, or if desired, the clutch assemblies can first be assembled on the splines on the side gears 22 and 24 before inserting such subassemblies into the casing. When assembled in the casing 10, the axially extending portions 66 of the abutting means 60 are interposed between the tangs 50 and the side walls of the grooves 52 and thereby reduces the unit pressure load that the tangs would otherwise directly impose on the walls of the groove; however, the axially extending portion is not limited to being thusly positioned.

Torque responsive means, including portions of the differential unit, are adapted to provide a clutch engaging load in response to the transmission of torque by the unit. More particularly, the teeth 23 and 25 of the side gears 22 and 24 and the teeth 33 and 35 of the pinion gears 32 and 34 intermeshed therewith are preferably formed with positive pressure angles so that upon the transmission of torque between the intermeshed teeth, the same urge the axially outer portions 68 and 70 of the side gears 22 and 24 respectively, which portions act as pressure plates, axially outwardly to press against the assembly 40 interposed axially intermediate the same and the adjoining surfaces 10A or 10B of the casing 10, thereby imposing an engaging load on the friction surfaces of the members 42 and 44. It is seen, then, that the side gear teeth 23 and 25 are not only operatively connected to transmit torque from the pinion gears to the axle shafts 16 and 18 respectively but are also operatively connected to the pressure plate portions 68 and 70 and function to urge the same axially outwardly to engage the clutch by compressing the assembly against the surfaces 10A or 10B of the casing 10.

As shown in FIG. 2, a space has been provided between the clutch assembly 40 and the pressure plate portions 68 and 70; however, such has been greatly exaggerated for the purposes of illustration. It is preferred that only a relatively small spacing exist therebetween so that upon outward movement of the pressure plate portions 68 and 70, engagement will easily occur. It is also contemplated that an interference fit can exist between the assembly 40 and the pressure plate portions 68 and 70 adjacent the same so that the assemblies, in addition to the resilient preload, are also preloaded in a nonresilient manner between the pressure plate portions and the casing 10. However, since this latter preload will eliminate the backlash between the intermeshed gear teeth, proper provisions should be made.

While only a single embodiment of this invention and modifications thereof have been shown and described, it is understood that such is for the purpose of illustration only and not for the purpose of limiting this invention as defined in the following claims.

What is claimed is:

1. In a differential transmission unit the combination comprising
   (a) a rotatable casing,
   (b) differential gearing disposed within said casing and adapted to be driven thereby,
   (c) clutch means disposed in said casing and operatively connected to said gearing for inhibiting relative rotation of gears of said differential gearing,
   (d) said clutch means including resilient means and clutchable elements with said resilient means imparting a resilient clutching load to said clutchable elements the action and reaction of which is independent of said casing.

2. In a differential transmission unit the combination comprising
   (a) a rotatable casing,
   (b) differential gearing disposed within said casing and adapted to be driven thereby,
   (c) clutch means in said casing operative to frictionally connect at least one gear of said differential gearing to said casing,
   (d) said clutch means being separate from said casing and insertable thereinto and including resilient means and friction surface means with said resilient means imparting a resilient load to said friction surface means the action and reaction of which is independent of said casing.

3. In a differential transmission unit the combination comprising (a) a rotatable casing member, (b) differential gearing including gear members disposed within said casing member and adapted to be driven thereby, (c) clutch means in said casing member connected to at least one gear member of said differential gearing for frictionally inhibiting relative rotation of the gear members of said differential gearing, (d) said clutch means being separate from said casing member and insertable thereinto and including friction surface means and resilient means imposing a resilient engaging load to said friction surface means the action and reaction of which is independent of said casing member, (e) and means including at least a portion of at least one of said members for imposing a torque responsive engaging load to said clutch means by acting in response to the transmission of torque by said differential gearing.

4. In a differential transmission unit the combination comprising (a) a rotatable casing, (b) shift means drivingly connected to said casing and extending inwardly thereof, (c) a pair of compensating gears rotatably mounted on said shaft means, (d) a pair of side gears rotatably mounted in said casing and each being in meshing engagement with said compensating gears, (e) a unitary self-contained clutch means associated with at least one of said side gears for frictionally connecting said side gear to said casing, said unitary self-contained means comprising (1) a pair of cooperating friction surfaces one being rotatable with said casing and the other being rotatable with said one side gear, (2) means holding said friction surfaces in cooperating relationship, (3) resilient means imparting a resilient load to said friction surfaces the force of which is contained within said holding means and is independent of said casing.

5. The differential transmission unit of claim 4 wherein said holding means comprises (a) a pair of axially spaced abutment means, (b) and an axially extending means interconnecting said abutment means.

6. In a differential transmission unit the combination comprising (a) a rotatable casing, (b) shaft means drivingly connected to said casing and extending inwardly thereof, (c) a pair of compensating gears rotatably mounted on said shaft means, (d) a pair of side gears rotatably mounted in said casing and each being in meshing engagement with said compensating gears, (e) a unitary self-contained means associated with at least one of said side gears to frictionally connect said one side gear to said casing, (f) the pitch lines of said compensating gears and said side gears being disposed at an angle to utilize the axial thrust of the meshing teeth of said gears to urge said one side gear axially outwardly to apply an engaging force to said self-contained means in response to the transmission of torque by said gears, (g) said unitary self-contained means comprising (1) a pair of cooperating friction surfaces one being rotatable with said casing and the other being rotatable with said one side gear, (2) means holding said friction surfaces in cooperating relationship, (3) resilient means imparting a bias to said friction surfaces the force of which is contained within said holding means and is independent of said casing.

7. In a differential transmission unit the combination comprising (a) a rotatable gear case, (b) differential gearing disposed in and driven by said gear case and including a plurality of relatively rotatable gear means having intermeshing gear teeth, (c) clutch means disposed in said gear case for inhibiting the relative rotation of said gear means and being operatively disposed between one of said gear means and said gear case, and (d) said clutch means including clutchable elements and resilient means for loading said clutchable elements with the action and reaction forces of said loads being independent of said gear case and said gear teeth whereby said load of said resilient means is not imposed on said case and does not interfere with the intermeshing of said gear teeth.

8. A differential transmission comprising in combination (a) a rotatable housing, (b) a pair of axially opposed output shaft means extending into said housing and rotatable relative thereto, (c) compensating gear means including, (1) means drivingly connecting the same to said housing for unitary rotation therewith and for rotation relative thereto, (2) gear teeth means carried by said compensating gear means, (d) a pair of side gear teeth means including means mounting one of said teeth means on each of said output shaft means for unitary rotation therewith, (e) friction clutch means disposed in said housing and including first and second friction elements, (f) means drivingly connecting said first friction element to said housing, (g) means drivingly connecting said second friction element to said side gear teeth means, (h) said clutch means also including resilient means the action and reaction forces of which are independent of said housing and said gear teeth means pressing said friction elements into engagement.

9. A differential transmission unit comprising in combination (a) a differential housing having an axis of rotation, (b) a gear train disposed in said housing and including compensating gears and a pair of axially opposed side gears with each of said gears having gear teeth thereon and said side gear teeth intermeshed with said compensating gear teeth, (c) a pair of axially spaced abutting surfaces and axially extending means securing the same in an axially spaced relationship, (d) said surfaces being disposed axially intermediate the teeth of one of said side gears and said housing and being independent of and axially movable relative to said housing, (e) clutch means for frictionally connecting said one side gear to said housing and including friction surfaces disposed between said abutting surfaces and resilient means acting and reacting upon said abutting surfaces and resiliently preloading said friction surfaces, (f) whereby the action and reaction loads of said resilient means in preloading said friction surfaces are independent of said housing and said gear teeth.

10. A differential transmission comprising in combination, (a) a rotatable housing, (b) a pair of axially opposed output shaft means extending into said housing and rotatable relative thereto, (c) compensating gear means including,
   (1) means drivingly connecting the same to said housing for unitary rotation therewith and for rotation relative thereto,
   (2) gear teeth means carried by said compensating gear means,
(d) a pair of side gear teeth means including means mounting one of said pair of teeth means on each of said output shaft means for unitary rotation therewith,
(e) friction clutch means disposed in said housing and including first and second friction elements,
(f) means drivingly connecting said first friction element to said housing,
(g) means drivingly connecting said second friction element to said side gear teeth means,
(h) said clutch means also including a holding means separate from said housing and said gear teeth means,
(i) said holding means being axially movable relative to said housing means,
(j) said clutch means also including resilient means imposing its action and reaction loads upon said holding means with such action and reaction loads being independent of said housing means and gear teeth means and resiliently pressing said friction elements into engagement.

11. A differential transmission unit comprising in combination
(a) a differential housing having an axis of rotation,
(b) a gear train disposed in said housing and including compensating gears and a pair of axially opposed side gears with each of said gears having gear teeth thereon and said side gear teeth intermeshed with said compensating gear teeth,
(c) a pair of spaced abutting means and including means securing the same in a spaced relationship,
(d) clutch means having a pair of opposed surfaces abutted by said abutting means and including
   (1) at least a first and a second friction surface and resilient means acting and reacting upon said abutting means and resiliently preloading said friction surfaces against each other,
(e) said abutting means and clutch means being inserted in said housing in a position axially intermediate said housing and said gear teeth,
(f) means drivingly connecting said first friction surface to said housing and means drivingly connecting said second friction surface to the gear teeth of said one side gear,
(g) whereby said resilient means preloads said friction surfaces independently of said housing and gear teeth.

12. In a differential transmission unit the combination comprising
(a) a rotatable casing means,
(b) differential gearing means disposed in said casing means and including a plurality of relatively rotatable gear means,
(c) clutch means including clutchable elements disposed in said casing means for inhibiting the relative rotation of said gear means,
(d) torque responsive means including a portion of at least one of the aforementioned means for imposing an engaging load on said clutchable elements in response to the transmission of torque by said gear means,
(e) and said clutch means also including preloading means including resilient means for preloading said clutchable elements with the action and reaction forces of said preload being independent of said casing means said torque responsive means and said portion.

13. A differential transmission comprising in combination, (a) a rotatable housing,
(b) a pair of axially opposed output shaft means extending into said housing and rotatable relative thereto,
(c) compensating gear means including
   (1) means drivingly connecting the same to said housing for unitary rotation therewith and for rotation relative thereto,
   (2) gear teeth means carried by said compensating gear means,
(d) a pair of side gear teeth means including means mounting one of said pair of teeth means on each of said output shaft means for unitary rotation therewith,
(e) friction clutch means disposed in said housing and including first and second friction means with at least one of said friction means being operatively connected to one of said side gear teeth means for inhibiting relative rotation of said pair of side gear teeth means,
(f) said friction clutch means also including a pair of axially spaced holding means formed separately from said housing and said gear teeth means,
(g) said holding means including means maintaining the same in an axially spaced relationship and being axially movable relative to said housing means,
(h) said friction means being annular in shape and having radially extending cooperating friction surfaces and being axially interposed between said holding means,
(i) said clutch means also including resilient means at least a portion of which is axially interposed between said holding means and imposing its action and reaction loads upon said holding means and resiliently pressing said friction surfaces of said friction means into engagement.

14. A differential transmission unit comprising in combination
(a) a differential housing having an axis of rotation,
(b) a gear train disposed in said housing and including compensating gears and a pair of axially opposed side gears with each of said gears having gear teeth thereon and said side gear teeth intermeshed with said compensating gear teeth,
(c) a pair of axially spaced radially extending abutting surfaces and axially extending means securing the same in an axially spaced relationship,
(d) said abutting surfaces being disposed axially intermediate one of said side gears and the adjacent portion of said housing and being independent of and axially movable relative to said housing and said one side gear,
(e) means for frictionally connecting said one side gear to said housing and including at least a first and a second friction element each having a radially extending friction surface cooperatively disposed with each other and adapted to be pressed into frictional engagement,
(f) said friction elements being disposed axially intermediate said abutting surfaces,
(g) means drivingly connecting said first friction element to said housing and means drivingly connecting said second friction element to said one side gear,
(h) and resilient means at least a portion of which is disposed between said abutting surfaces and acting and reacting therebetween and resiliently preloading said friction elements and urging the friction surfaces thereof into engagement,
(i) said one side gear being adapted to move axially outwardly relative to said housing,
(j) said gear teeth having a positive pressure angle and being adapted to urge said one side gear axially outwardly toward said housing upon the transmission of torque thereby,
(k) at least a portion of said clutch means being disposed in such a position that upon outward movement of said side gear the latter imposes an engaging load thereon whereby upon the transmission of torque by said differential housing said one side gear imposes an engaging load on said clutch means.

15. A differential transmission unit comprising in combination
   (a) a differential housing having an axis of rotation,
   (b) a gear train disposed in said housing and including compensating gears and a pair of axially opposed side gears with each of said gears having gear teeth thereon and said side gear teeth intermeshed with said compensating gear teeth,
   (c) a pair of axially spaced radially extending abutting surfaces and axially extending means securing the same in an axially spaced relationship,
   (d) said abutting surfaces being disposed axially intermediate one of said side gears and the adjacent portion of said housing and being independent of and axially movable relative to said housing and said one side gear,
   (e) means for frictionally connecting said one side gear to said housing and including a plurality of annular friction disk members with at least one thereof drivingly connected to said one side gear,
   (f) at least a portion of said friction disk members being disposed axially intermediate said abutting surfaces,
   (g) an annular resilient means engageable with said friction disk members and disposed axially intermediate said abutting surfaces and acting and reacting therebetween for resiliently preloading said disk members between said abutting surfaces,
   (h) whereby the action and reaction loads of said resilient means in preloading said members are independent of said housing and side gear.

16. A differential transmission unit comprising in combination
   (a) a differential housing having an axis of rotation,
   (b) a gear train disposed in said housing and including a pair of radially spaced compensating gears and a first and a second side gear disposed in axially spaced relationship with each of said gears having gear teeth thereon and said side gear teeth intermeshed with said compensating gear teeth,
   (c) a first and a second clutch pack means with each including
      (1) a pair of axially spaced abutting surfaces including means securing the same in an axially spaced relationship,
      (2) clutch means including at least a first and a second friction element having cooperating friction surfaces thereon adapted to be pressed into a frictional engaged relationship, and
      (3) resilient means acting and reacting upon said abutting surfaces and resiliently preloading said friction surfaces against each other and between said abutting surfaces,
   (d) said clutch pack means being inserted in said housing with one being positioned axially intermediate said housing and said first side gear and the other positioned axially intermediate said housing and said second side gear,
   (e) means including a portion of said clutch pack means drivingly connecting said first friction elements to said housing and means including at least a portion of said clutch pack means drivingly connecting said second friction elements to said side gears,
   (f) whereby said resilient means preloads said friction surfaces independently of said housing and said gear teeth and said resilient means of said first clutch pack means preloads the same independently of the resilient means of said second clutch pack means.

17. A differential transmission unit comprising in combination
   (a) a differential housing having an axis of rotation,
   (b) a gear train disposed in said housing and including a pair of radially spaced compensating gears and a first and a second side gear disposed in axially spaced relationship with each of said gears having gear teeth thereon and said side gear teeth intermeshed with said compensating gear teeth,
   (c) said compensating gears including means drivingly connecting the same to said housing for unitary rotation therewith and for rotation relative thereto,
   (d) said side gears being mounted in said housing for rotation and axial movement relative thereto,
   (e) a first and a second clutch pack means with each including
      (1) a plurality of annular radially extending friction surface means having cooperating friction surfaces thereon,
      (2) a pair of axially spaced abutting surfaces including means securing the same in an axially spaced relationship,
      (3) and annular resilient washer means having at least a portion thereof disposed intermediate said abutting surfaces and acting and reacting upon said abutting surfaces and resiliently preloading said friction surfaces against each other,
   (f) said clutch pack means being inserted in said housing with one of the same being positioned axially intermediate said housing and said first side gear and the other of the same being positioned axially intermediate said housing and said second side gear,
   (g) means including a portion of said clutch pack means drivingly connecting some of said friction surface means to said housing and means including at least a portion of said clutch pack means drivingly connecting other of said friction surface means to said side gears,
   (h) whereby said resilient washer means preloads the cooperating friction surfaces of said friction surface means independently of said housing and said gear teeth and said resilient means of said first clutch pack means preloads the same independently of the resilient means of said second clutch pack means.

18. A differential transmission unit comprising in combination
   (a) a differential housing having an axis of rotation,
   (b) a gear train disposed in said housing and including a pair of radially spaced compensating gears and a first and a second side gear disposed in axially spaced relationship and with each of said gears having gear teeth thereon and said side gear teeth intermeshed with said compensating gear teeth,
   (c) said compensating gears including means drivingly connecting the same to said housing for unitary rotation therewith and for rotation relative thereto,
   (d) said side gears being mounted in said housing for rotation relative thereto,
   (e) a separate preassembled clutch pack means including
      (1) a first and a second plurality of annular friction disks having radially extending friction surfaces thereon, and
      (2) a pair of axially spaced abutting surfaces including means securing the same in an axially spaced relationship,
   (f) said friction disks being interleaved with each other and disposed in an axial side by side relationship and with at least a portion thereof disposed axially intermediate said abutting surfaces,
   (g) at least one of said friction disks being of spring-washer configuration and axially compressed whereby said pluralities of friction disks are resiliently preloaded between said abutting surfaces and said abutting surfaces maintains said friction disks in the clutch pack assembled condition,
   (h) said clutch pack means being preassembled and inserted as an assembly into said housing and positioned axially intermediate said housing and one of said side gears,
(i) means drivingly connecting some of said friction disks to said housing and means drivingly connecting other of said friction disks to said side gear,
(j) and torque responsive means including portions of said differential transmission unit being responsive to the transmission of torque thereby for imposing a compressing load on said friction disks,
(k) whereby said pluralities of said friction disks are subjected to a plurality of loads at least one of which being the resilient load induced by said one friction disk and at least another of which being the load induced thereon by said torque responsive means.

19. A differential transmission unit comprising in combination
(a) a differential housing having an axis of rotation,
(b) a gear train disposed in said housing and including a pair of radially spaced compensating gears and a first and a second side gear disposed in axially spaced relationship and with each of said gears having gear teeth thereon and said side gear teeth intermeshed with said compensating gear teeth,
(c) said compensating gears including means drivingly connecting the same to said housing for unitary rotation therewith and for rotation relative thereto,
(d) said side gears being mounted in said housing for rotation and axial movement relative thereto,
(e) a separate preassembled clutch pack means including
 (1) a first and a second plurality of annular friction disks having radially extending friction surfaces thereon, and
 (2) a pair of axially spaced abutting surfaces including means securing the same in an axially spaced relationship,
(f) said friction disks being interleaved with each other and disposed in an axial side by side relationship and with at least a portion thereof disposed axially intermediate said abutting surfaces,
(g) at least one of said friction disks being of spring-washer configuration and compressed substantially flat whereby said pluralities of friction disks are resiliently preloaded between said abutting surfaces and said abutting surfaces maintain said friction disks in the clutch pack assembled condition,
(h) said clutch pack means being preassembled and inserted as an assembly into said housing and positioned axially intermediate said housing and one of said side gears,
(i) means drivingly connecting some of said friction disks to said housing and means drivingly connecting other of said friction disks to said side gear,
(j) said gear teeth having a positive pressure angle for urging said one side gear axially outwardly upon transmission of torque by said gear train,
(k) said side gear being adapted to axially pressingly engage at least a portion of said clutch pack means and urge at least a portion of the latter into pressing engagement with said housing for urging said pluralities of friction disks into pressing engagement with each other,
(l) whereby said pluralities of said friction disks are subjected to a plurality of loads at least one of which being the resilient load induced by said one friction disk and at least another of which being the load induced thereon by said one side gear moving axially outwardly.

20. A differential transmission unit comprising in combination
(a) a differential housing having an axis of rotation,
(b) a pair of compensating gears spaced radially on opposed sides of said axis and including shaft means mounting the same for unitary rotation with said housing and for simultaneous rotation about an axis substantially normal to the axis of said housing,
(c) a first and a second side gear disposed coaxially with said housing axis and positioned in an axially spaced relationship on opposed sides of said compensating gears,
(d) each of said gears having gear teeth thereon with the teeth of said side gears being intermeshed with the teeth of said compensating gears,
(e) means mounting said side gear in said housing for rotation relative thereto and allowing said first side gear to move axially relative to said housing,
(f) said first side gear having an axially outer face including a first radially extending portion and said housing having a second radially extending portion with said radially extending portions being disposed in an axially spaced cooperating relationship,
(g) a separate preassembled clutch pack means disposed axially intermediate said radially extending portions and including
 (1) a first plurality of annular friction disks and a second annular friction disk all having radially extending friction surfaces thereon, and
 (2) abutting means including a pair of axially spaced abutting surfaces and axially extending securing means securing the same in an axially spaced relationship,
(h) at least one of said friction disks being of a resilient spring-washer configuration and compressed substantially flat,
(i) two of said first plurality of friction disks being outer friction disks with one being disposed on each of the opposed axial sides of said second friction disk with the friction surfaces thereon in a side by side cooperating relationship and all of said first friction disks having engaging means extending radially from the friction surfaces thereon which means extends radially beyond the periphery of said second plurality of annular friction disks,
(j) said abutting surfaces being in abutting engagement with the axially outer portions of said engaging means of said outer friction disks and maintaining said first and second friction disks, including said one friction disk, in a substantially flat condition and maintaining said clutch pack means as a separate resiliently preloaded assembly with said one friction disk resiliently preloading said friction surfaces,
(k) said engaging means and said abutting means commencing and extending radially outwardly of said first and second radially extending portions,
(l) axially extending groove means formed in said housing and disposed cooperatively with and receiving said engaging means in a driving relationship whereby said housing and said first plurality of friction disks rotate unitarily,
(m) at least a portion of said means securing said abutting surfaces being disposed intermediate and engaging said engaging means and said housing means,
(n) said first side gear having hub means extending axially outwardly therefrom and disposed within said clutch pack means,
(o) said first plurality of friction disks being spaced radially outwardly from said hub means and said second friction disk being spaced radially inwardly from said housing,
(p) and means drivingly connecting said second plurality of friction disks to said hub means whereby said second plurality of friction disks rotates unitarily with said first side gear,
(q) and means responsive to the torque transmitted by said differential unit for imposing a load on said friction surfaces of said friction disks and including at least said first side gear,
(r) said gear teeth having positive pressure angles so that upon the transmission of torque thereby said first side gear is urged axially outwardly and said first radially extending portion thereon imposes an engaging force on said friction surfaces by compressing the latter between said first and second radially extending portions.

References Cited

UNITED STATES PATENTS

| | | | |
|---|---|---|---|
| 1,750,981 | 3/1930 | Wildhaber | 74—711 |
| 1,883,725 | 10/1932 | Guilmette | 74—711 |
| 2,930,256 | 3/1960 | Wildhaber | 74—711 |
| 2,966,076 | 12/1960 | O'Brien | 74—711 |

FOREIGN PATENTS 927,924 6/1963 Great Britain.

FRED C. MATTERN, JR., *Primary Examiner.*

DAVID J. WILLIAMOWSKY, *Examiner.*

J. A. WONG, *Assistant Examiner.*